(12) United States Patent
Hohrman

(10) Patent No.: US 7,273,216 B1
(45) Date of Patent: Sep. 25, 2007

(54) WELDING TANK CART SYSTEM

(76) Inventor: Harlan W. Hohrman, 107 E. Park Ave., Fort Pierre, SD (US) 57532

( * ) Notice: Subject to any disclaimer, the term of this patent is extended or adjusted under 35 U.S.C. 154(b) by 0 days.

(21) Appl. No.: 11/459,391

(22) Filed: Jul. 24, 2006

(51) Int. Cl.
 *B62B 1/00* (2006.01)
(52) U.S. Cl. .................... 280/79.5; 280/47.26
(58) Field of Classification Search ............. 280/79.5, 280/47.17, 47.19, 47.2, 47.24, 47.27, 47.315, 280/47.35, 79.3, 79.6, 79.7, 47.26
 See application file for complete search history.

(56) References Cited

U.S. PATENT DOCUMENTS

| | | | |
|---|---|---|---|
| 1,913,295 A | | 6/1933 | Schreck |
| 2,477,294 A | | 7/1949 | Fuller |
| 2,583,196 A | * | 1/1952 | Zander et al. ........... 280/47.35 |
| 2,616,720 A | | 11/1952 | Knoth |
| 2,635,775 A | | 4/1953 | Ernst |
| 2,654,493 A | * | 10/1953 | Kernkamp ................. 414/448 |
| 2,786,692 A | * | 3/1957 | Timpson .................... 280/648 |
| D183,135 S | * | 7/1958 | May ........................... D34/18 |
| 4,187,950 A | * | 2/1980 | Peet ........................... 414/421 |
| 4,205,937 A | * | 6/1980 | Fawley ....................... 414/457 |
| 5,122,027 A | | 6/1992 | Tabayashi |
| 5,145,311 A | | 9/1992 | Salvucci |
| 5,658,118 A | | 8/1997 | Luca |
| 5,865,449 A | * | 2/1999 | Castaneda .............. 280/33.996 |
| 6,116,623 A | * | 9/2000 | Salvucci ................... 280/47.26 |
| 6,224,071 B1 | * | 5/2001 | Dummer .................... 280/47.2 |
| 6,296,260 B1 | * | 10/2001 | Schiavone ................ 280/47.2 |
| 6,454,281 B1 | * | 9/2002 | Pearson .................... 280/47.26 |
| 6,554,300 B1 | | 4/2003 | Ziolkowski |
| 6,682,084 B2 | * | 1/2004 | Webster et al. ............ 280/79.5 |
| 6,799,769 B2 | | 10/2004 | Ziolkowski |
| 6,880,838 B2 | * | 4/2005 | Hjorth ....................... 280/79.2 |
| 7,114,732 B1 | * | 10/2006 | Ismail ..................... 280/47.34 |
| 2002/0109322 A1 | | 8/2002 | Bock |
| 2003/0141685 A1 | | 7/2003 | Ziolkowski |
| 2004/0245736 A1 | | 12/2004 | Intravatola |
| 2005/0073118 A1 | | 4/2005 | Sharp |

* cited by examiner

*Primary Examiner*—J. A Shriver

(57) ABSTRACT

A welding tank cart system for providing efficient transportation of welding tanks and welding supplies. The welding tank cart system includes a frame, a pair of side wheels, a wheel support connected to the frame, and a front wheel connected to the wheel support, wherein the front wheel is comprised of a swivel wheel. A tray is pivotally connected within the frame to provide for self-leveling regarding of the attitude of the frame. A chain crank is connected to the frame for tightening a chain structure about the welding tanks.

16 Claims, 9 Drawing Sheets

WELDING TANK CART SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to welding carts and more specifically it relates to a welding tank cart system for providing efficient transportation of welding tanks and welding supplies.

2. Description of the Related Art

Any discussion of the prior art throughout the specification should in no way be considered as an admission that such prior art is widely known or forms part of common general knowledge in the field.

Welding carts have been in use for years. Conventional welding carts are comprised of a frame for supporting two tanks (oxygen and acetylene tanks) along with a pair of wheels. In addition, a chain or strap is secured about the welding tanks directly to the frame to secure the welding tanks to the frame.

However, to move the conventional welding cart the user must first pivot the welding cart rearwardly and then move the welding cart to the desired location which typically requires more than one hand to accomplish. In addition, conventional welding carts typically have a relatively loose chain or strap securing the welding tanks thereby allowing the welding tanks to unnecessarily move around during transportation thereof. Also, conventional welding carts do not have convenient storage space for various types of welding related items.

While these devices may be suitable for the particular purpose to which they address, they are not as suitable for providing efficient transportation of welding tanks and welding supplies. Conventional welding carts utilize two wheels for transportation thereby required tilting of the welding cart prior to movement thereof.

In these respects, the welding tank cart system according to the present invention substantially departs from the conventional concepts and designs of the prior art, and in so doing provides an apparatus primarily developed for the purpose of providing efficient transportation of welding tanks and welding supplies.

BRIEF SUMMARY OF THE INVENTION

In view of the foregoing disadvantages inherent in the known types of welding carts now present in the prior art, the present invention provides a new welding tank cart system construction wherein the same can be utilized for providing efficient transportation of welding tanks and welding supplies.

The general purpose of the present invention, which will be described subsequently in greater detail, is to provide a new welding tank cart system that has many of the advantages of the welding carts mentioned heretofore and many novel features that result in a new welding tank cart system which is not anticipated, rendered obvious, suggested, or even implied by any of the prior art welding carts, either alone or in any combination thereof.

To attain this, the present invention generally comprises a frame, a pair of side wheels, a wheel support connected to the frame, and a front wheel connected to the wheel support, wherein the front wheel is comprised of a swivel wheel. A tray is pivotally connected within the frame to provide for self-leveling regarding of the attitude of the frame. A chain crank is connected to the frame for tightening a chain structure about the welding tanks.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a welding tank cart system that will overcome the shortcomings of the prior art devices.

A second object is to provide a welding tank cart system for providing efficient transportation of welding tanks and welding supplies.

Another object is to provide a welding tank cart system that may be utilized with various types of welding tanks.

An additional object is to provide a welding tank cart system that does not require tilting prior to moving the welding cart.

A further object is to provide a welding tank cart system that utilizes a self-leveling tray for storing various types of items.

Another object is to provide a welding tank cart system that utilizes a chain tightening system for conveniently tightening the chain between the welding tanks.

A further object is to provide a welding tank cart system that is stable and not prone to tip over.

Another object is to provide a welding tank cart system that can be pulled by hoses connected to the welding tanks.

A further object is to provide a welding tank cart system that is easy to load on a vehicle.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
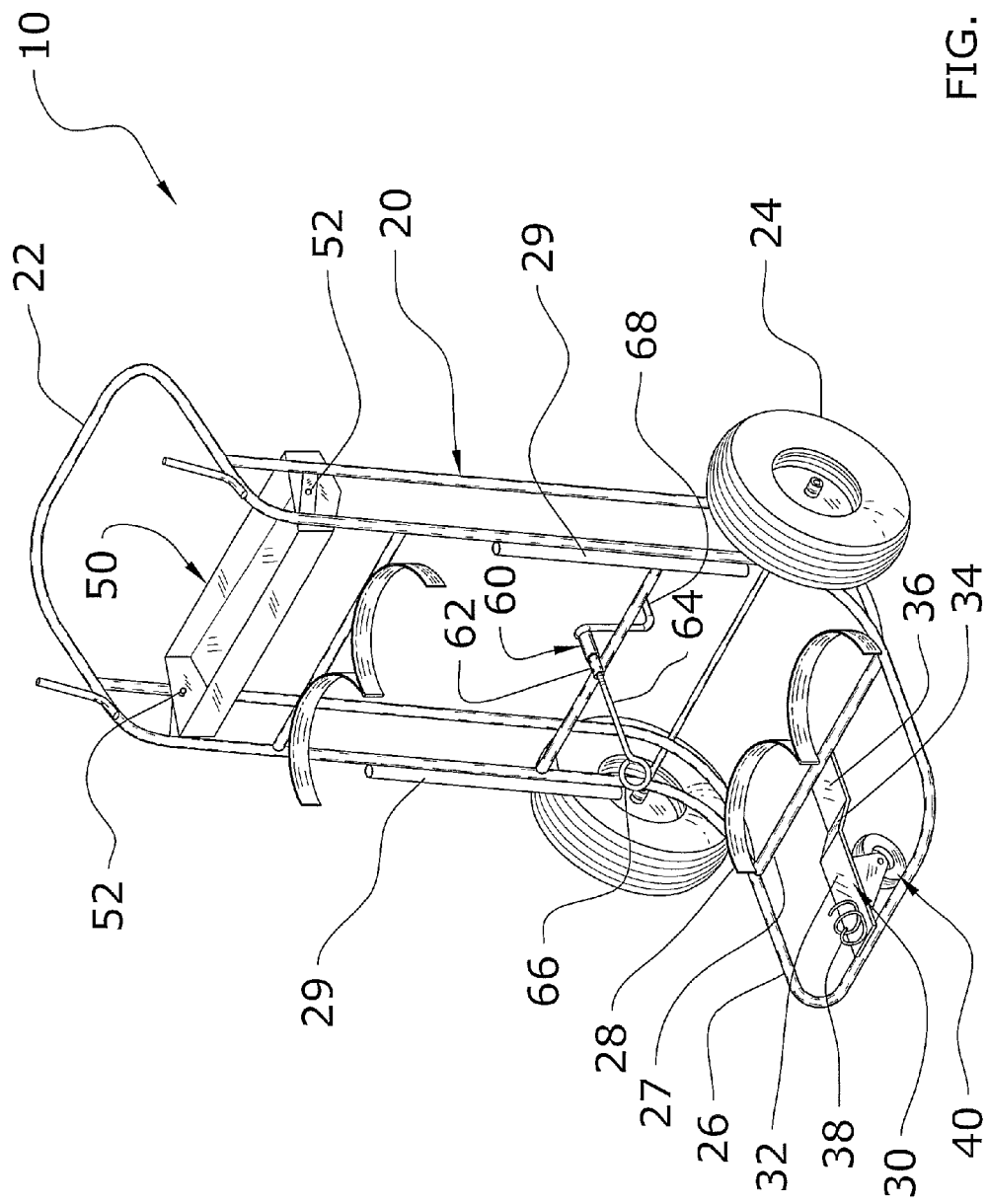
FIG. 1 is an upper perspective view of the present invention.

Turning now descriptively to the drawings, in which similar reference characters denote similar elements throughout the several views, FIGS. 1 through 9 illustrate a welding tank cart system 10, which comprises a frame 20, a pair of side wheels 24, a wheel support 30 connected to the frame 20, and a front wheel 40 connected to the wheel support 30, wherein the front wheel 40 is comprised of a swivel wheel. A tray 50 is pivotally connected within the frame 20 to provide for self-leveling regarding of the attitude of the frame 20. A chain crank 60 is connected to the frame 20 for tightening a chain structure 12 about the welding tanks.

B. Frame

Figure 3:
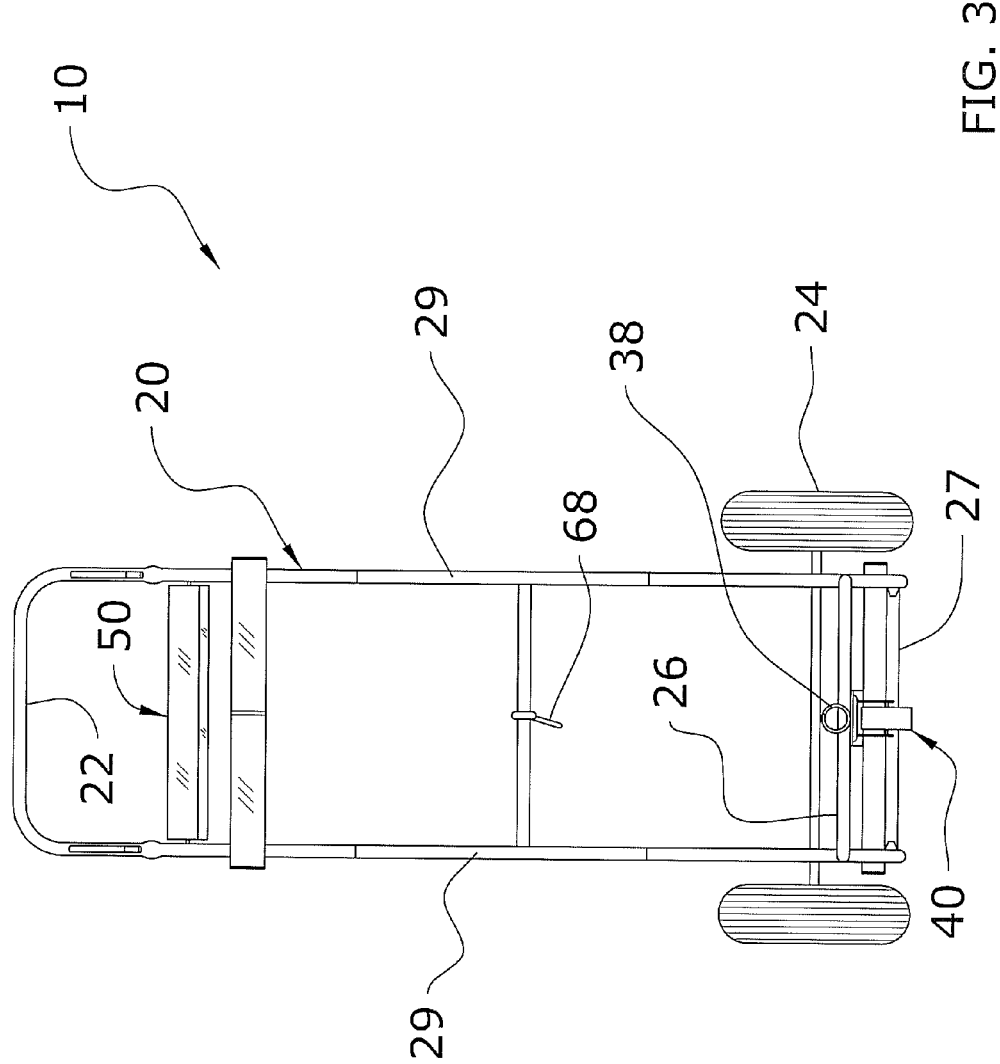
FIG. 3 is a front view of the present invention.

FIGS. 1 and 3 best illustrate an exemplary frame 20 for the present invention. It can be appreciated that the frame 20 illustrated in the attached drawings is not intended to limit the scope of the present invention. The frame 20 may be comprised of any structure capable of supporting and transporting a pair of welding tanks (e.g. oxygen tank and an acetylene tank). The frame may be comprised of various types of materials and structures.

The frame 20 preferably includes a handle 22 for allowing the user to manipulate the position of the present invention. The frame 20 further preferably includes a support platform 26 for supporting the welding tanks as best illustrated FIGS. 1 and 7 of the drawings. The support platform 26 preferably includes a cross member 27 that supports the bottom end of the welding tanks as shown in FIGS. 1 and 7 of the drawings. The frame 20 further preferably includes pair of lower saddles 28 and a pair of upper saddles 28 for receiving the pair of welding tanks as shown in FIGS. 1 through 7 of the drawings.

The frame 20 also preferably includes a pair of rod holders 29 as illustrated in FIGS. 1 through 3 and 5 through 7. The rod holders 29 are preferable comprised of an elongated tubular structure and configuration. An upper end of the rod holders 29 is also preferably open to receive a welding rod.

C. Side Wheels

Figure 4:
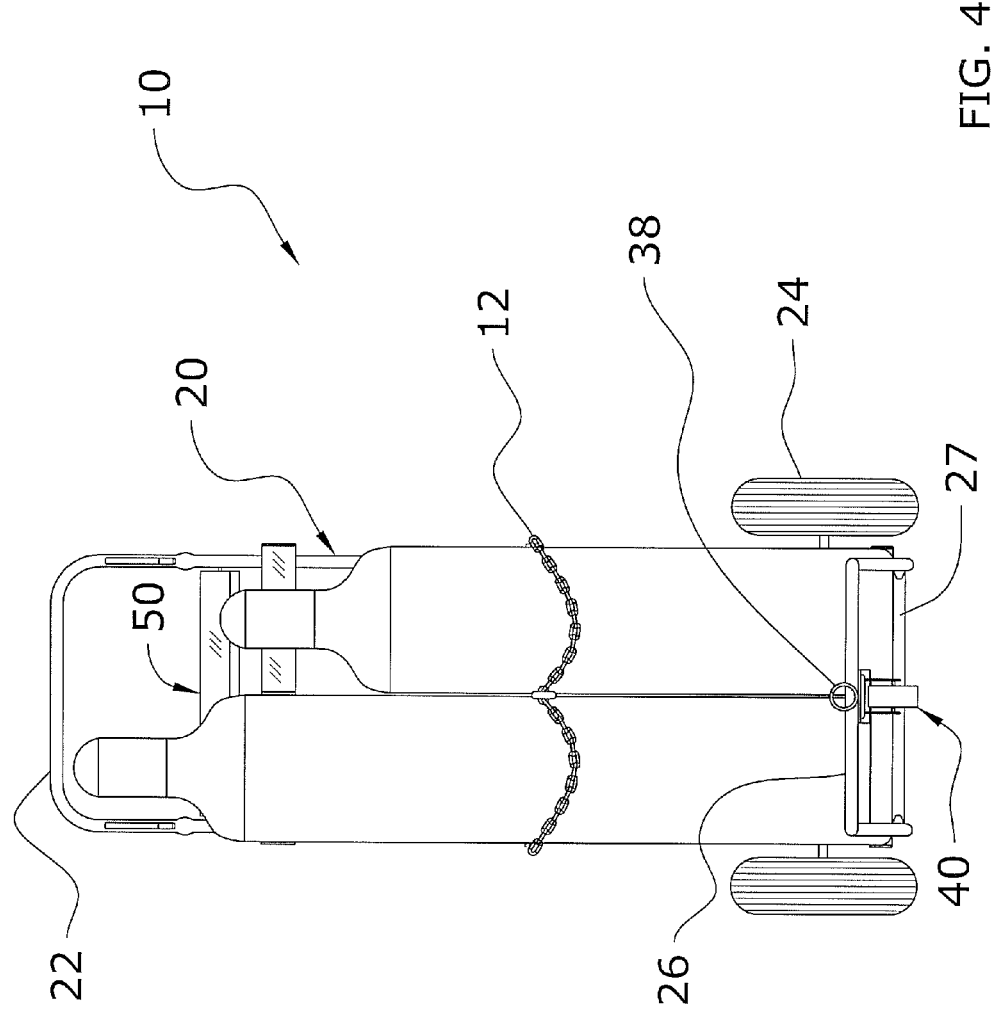
FIG. 4 is a front view of the present invention with welding tanks secured within.
Figure 5:
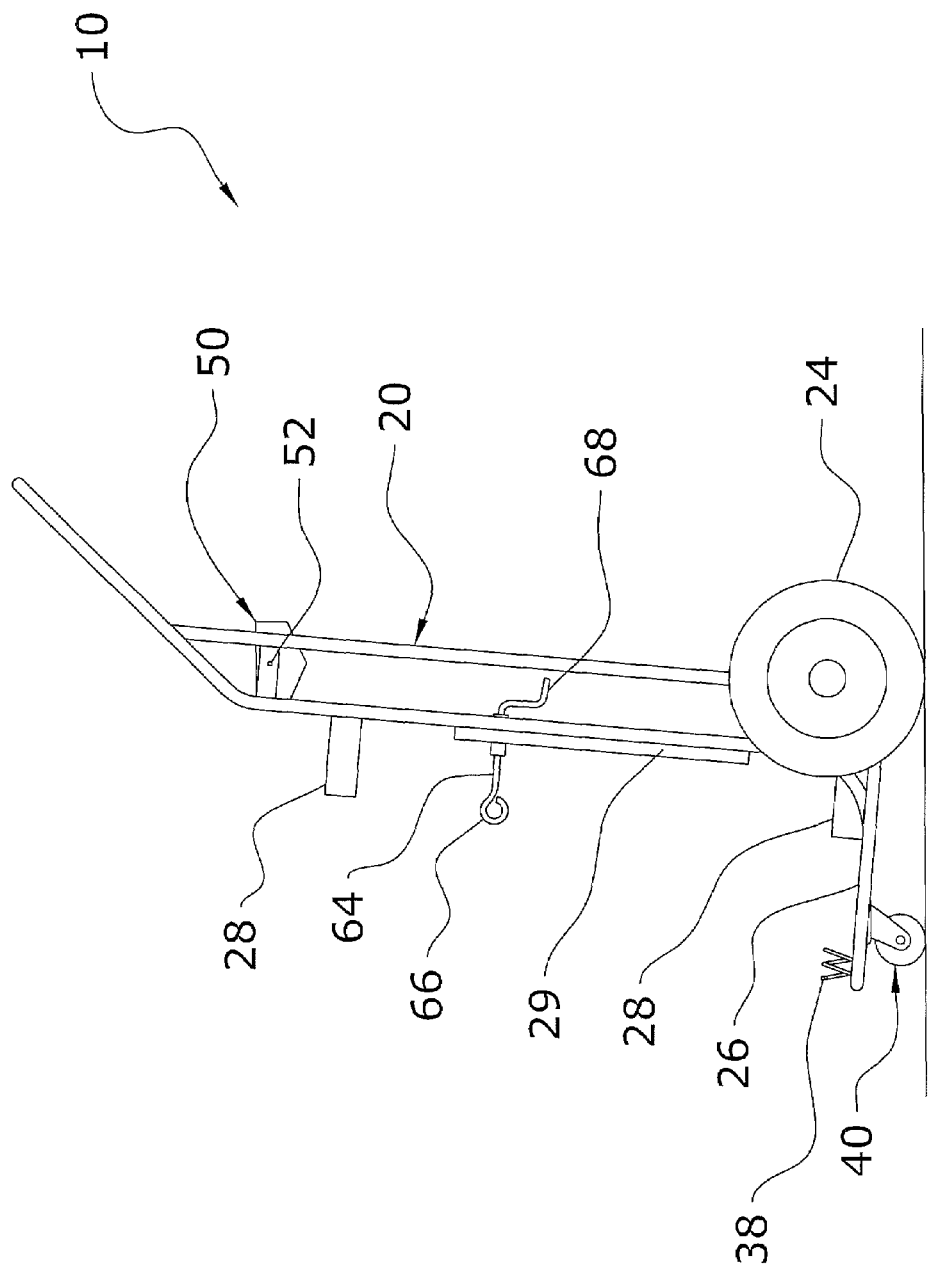
FIG. 5 is a left side view of the present invention.

The present invention includes at least a pair of side wheels 24 rotatably connected to opposing sides of the frame 20 as best illustrated in FIGS. 1, 3 and 4 of the drawings. The side wheels 24 are preferably larger than the front wheel 40 to provide for easy movement of the present invention upon various types of surfaces. The side wheels 24 are preferably pneumatic rubber tires, however various other structures may be utilized for the side wheels 24.

D. Wheel Support and Front Wheel

A wheel support 30 is connected to a front portion of the frame 20 as best illustrates in FIGS. 1 and 7 of the drawings. The wheel support 30 is preferably comprised of a lower portion 36 connected to a cross member 27 of the frame 20, an angled portion 34 extending forwardly and upwardly from the lower portion 36, and an upper portion 32 extending from the angle portion substantially parallel to the lower portion 36 as best illustrated in FIG. 7 of the drawings.

The lower portion 36 of the wheel support 30 allows for connection to the cross member 27 without interfering with the welding tanks resting upon the cross member 27. The wheel is connected to the upper portion 32 which is elevated above the lower portion 36 sufficiently to allow the front wheel 40 to freely rotate beneath thereof.

The front wheel 40 preferably is comprised of a structure that rotates upon a horizontal plane to allow for easy turning of the present invention. In particular, the front wheel 40 is preferably comprised of a caster wheel structure.

The wheel support 30 also preferably includes a hose holder 38 as illustrated in FIGS. 1 through 7 and 9. The hose holder 38 is preferably comprised of a pig tail structure and configuration, as shown in FIGS. 1, 2, 5 and 6. The hose holder 38 is preferably positioned on an upper side of the upper portion 32 of the wheel support 30. The hose holder 38 serves to hold a welding hose during operation. The user is able to attach the welding hose to the hose holder 38 by intertwining the welding hose through the hose holder 38 until the welding hose is positioned at the vertical center of the hose holder 38.

E. Tray

The tray 50 is pivotally connected at opposing ends thereof to an upper portion 32 of the frame 20 for self-leveling. At each opposing end of the tray 50 there is a pivot point 52 that freely allows the tray 50 to pivot, wherein the pivot point 52 is positioned near an upper part of the tray 50 to facilitate the self-leveling action.

F. Chain Crank

Figure 2:
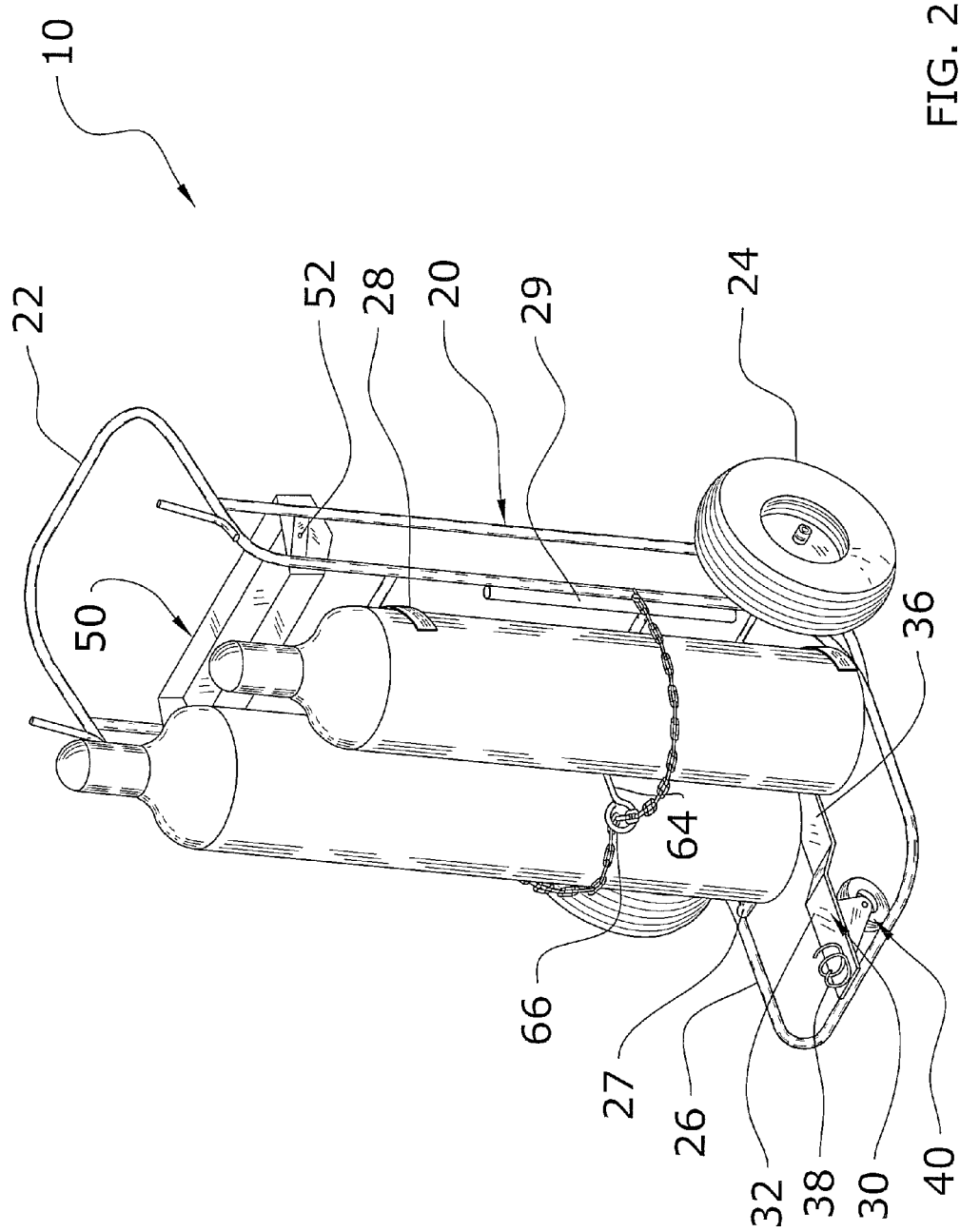
FIG. 2 is an upper perspective view of the present invention with welding tanks positioned thereupon.
Figure 6:
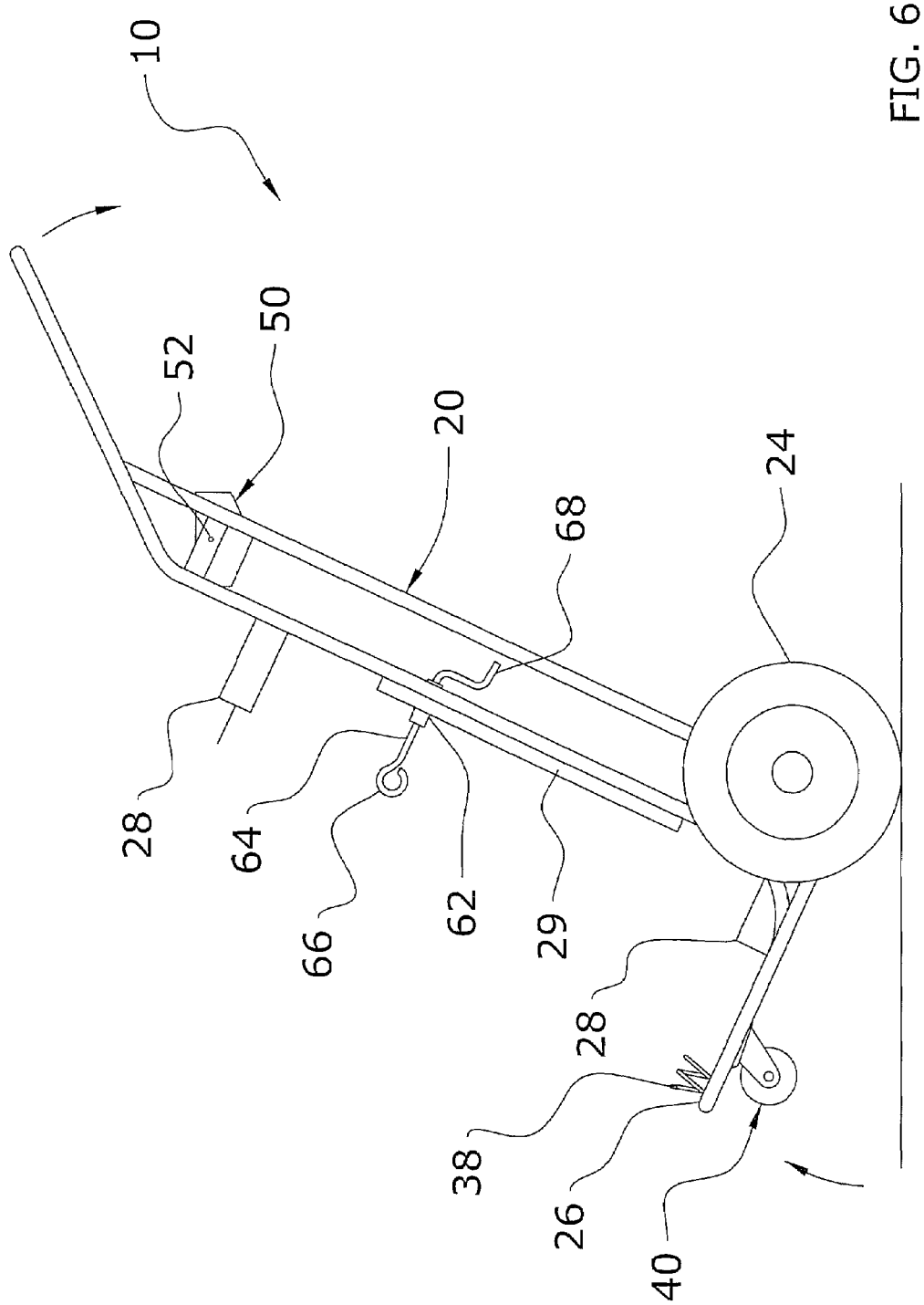
FIG. 6 is a left side view of the present invention tilted rearwardly illustrating the tray maintaining a substantially level state.
Figure 7:
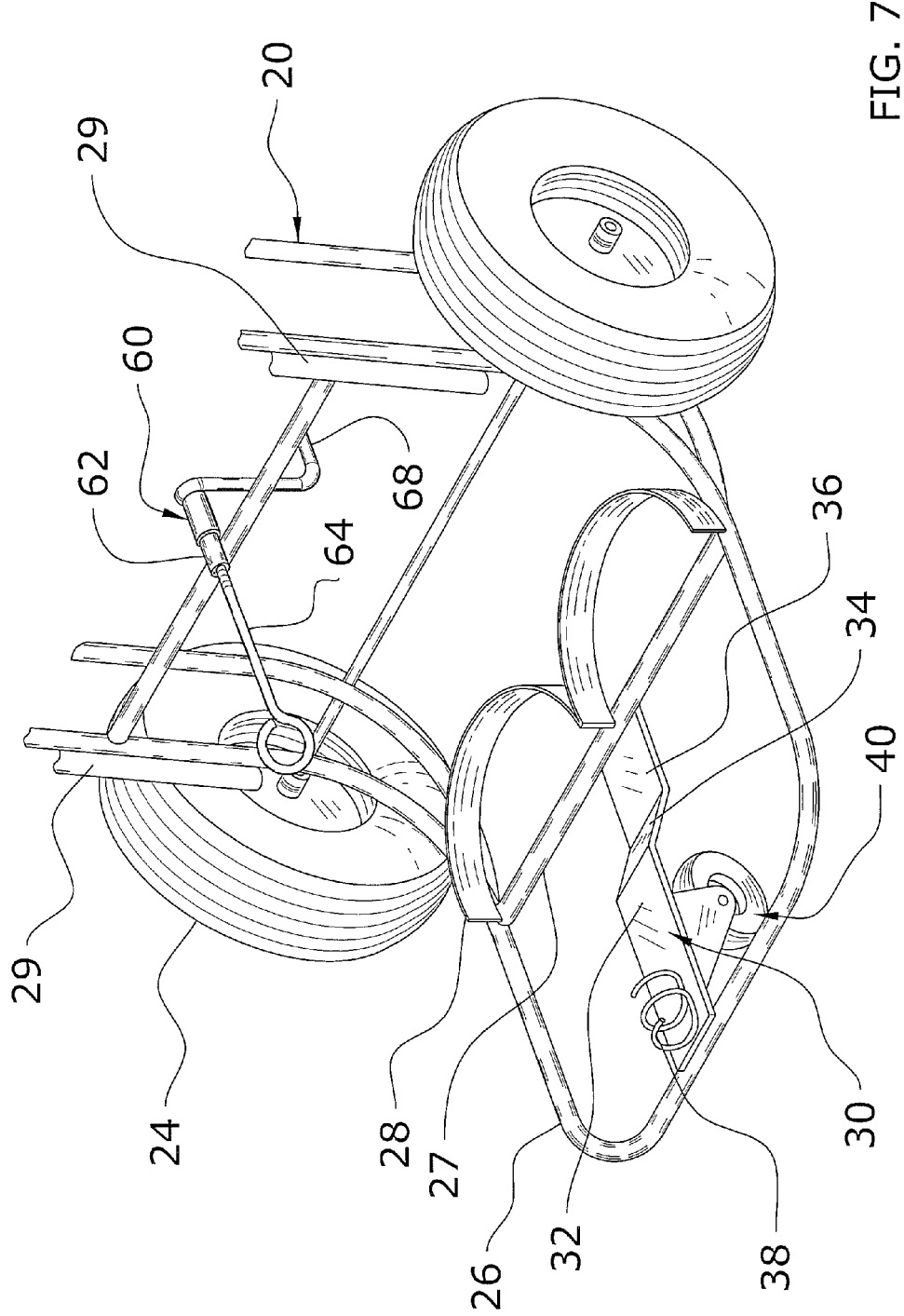
FIG. 7 is a magnified upper perspective view of the front portion of the present invention.
Figure 8:
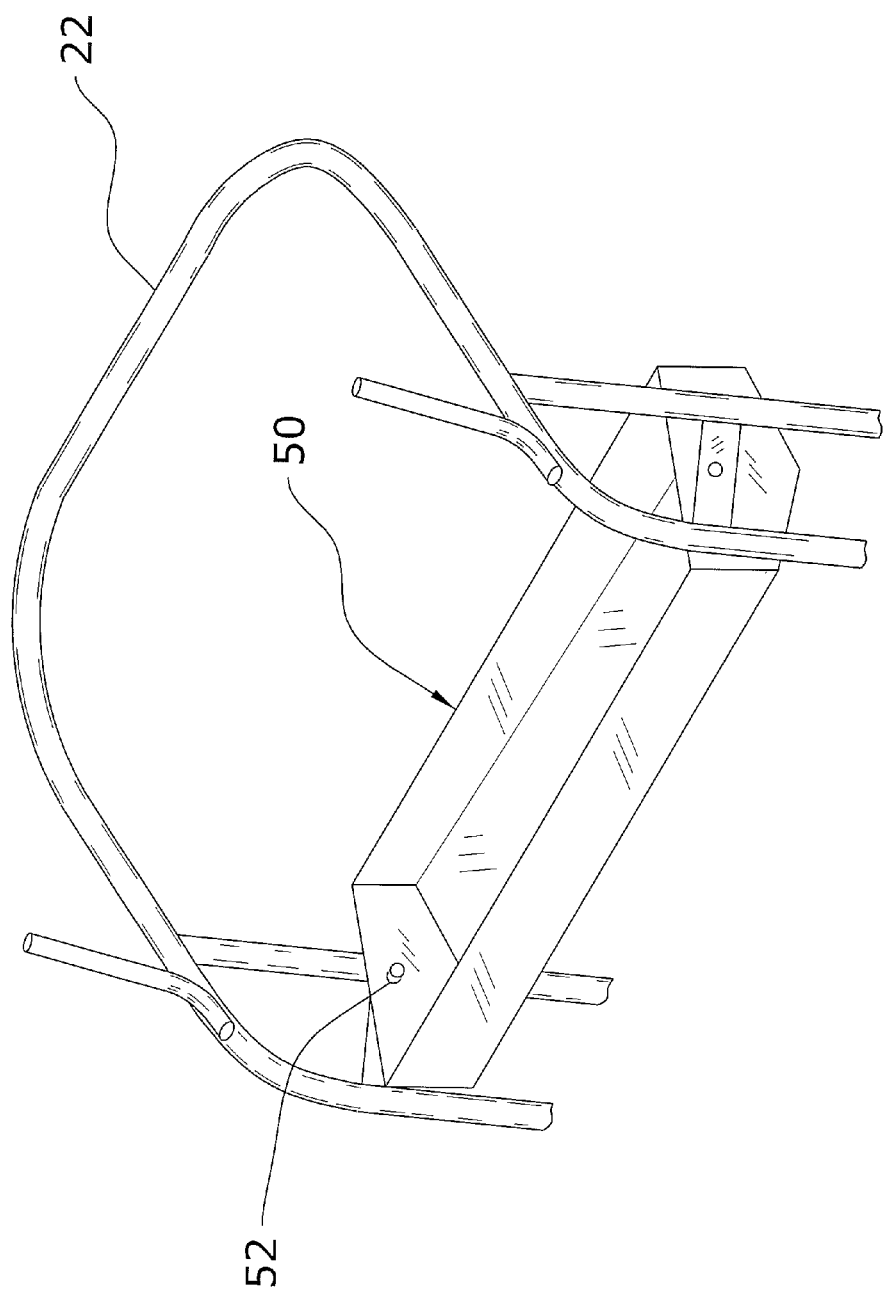
FIG. 8 is a magnified upper perspective view of the tray.
Figure 9:
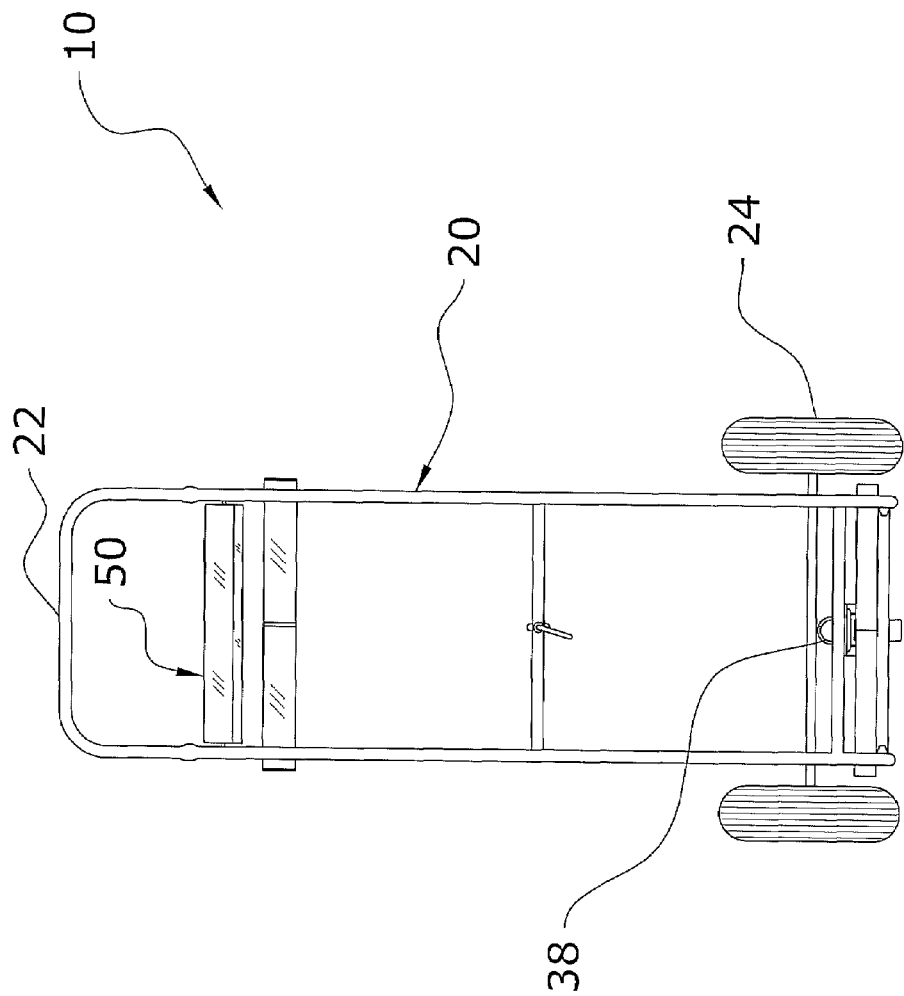
FIG. 9 is a rear view of the present invention.

The chain crank 60 is attached to same frame 20 as shown in FIGS. 1 and 6 of the drawings. The chain crank 60 is preferably positioned between a pair of welding tanks and is connected to a chain structure 12 for tightening and loosening the chain structure 12. The chain structure 12 extends about the pair of welding tanks to retain the same upon the frame 20 as shown in FIGS. 2 and 4 of the drawings.

The chain crank 60 is comprised of a mount 62, an elongated member 64, an eyelet 66 and a crank handle 68. The mount 62 is attached to the frame 20 as shown in FIG. 1 of the drawings. The mount 62 is preferably attached to a support member extending between opposing side portions of the frame 20.

The elongated member 64 extends from within the mount 62 in a movable manner along a longitudinal axis of the elongated member 64 (i.e. the elongated member 64 can be extended or retracted). The elongated member 64 is preferably threadably received within the mount 62 so that rotation of the elongated member 64 causes the elongated member 64 to extend or retract with respect to the mount 62 thereby loosen or tighten the chain structure 12 respectively. The elongated member 64 is sufficient in length to allow for extending past at least a portion of the welding tanks as shown in FIG. 2 of the drawings.

The eyelet 66 is attached to a distal end of the elongated member 64 as best illustrated in FIGS. 1 and 6 of the drawings. The eyelet 66 is connected to the chain structure 12 to allow for tightening and loosening of the chain about the welding tanks.

The crank handle 68 is attached to the elongated member 64 opposite of the eyelet 66 as illustrated in FIGS. 1, 3 and 5 through 9. The crank handle 68 is preferably comprised of an elongated structure suitable for rotating manually by hand thereby causing the elongated member 64 to extend or retract with respect to the mount 62.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A welding tank cart system, comprising:
   a frame;
   a pair of side wheels rotatably connected to opposing sides of said frame;
   a wheel support connected to a front portion of said frame; and
   a front wheel connected to said wheel support, wherein said front wheel is comprised of a swivel wheel;
   a chain crank attached to same frame, wherein said chain crank is positioned between a pair of welding tanks and is connected to a chain structure for tightening and loosening said chain structure, wherein said chain structure extends about said pair of welding tanks to retain the same upon said frame.

2. The welding tank cart system of claim 1, including a tray pivotally connected at opposing ends thereof to an upper portion of said frame for self-leveling.

3. The welding tank cart system of claim 1, wherein said chain crank is comprised of:
   a mount attached to said frame;
   an elongated member extending from within said mount in a movable manner along a longitudinal axis of said elongated member, wherein said elongated member is threadably received within said mount;
   an eyelet attached to a distal end of said elongated member, wherein said eyelet is connected to said chain structure; and
   a crank handle attached to said elongated member opposite of said eyelet.

4. The welding tank cart system of claim 1, wherein said front wheel is comprised of a caster wheel.

5. The welding tank cart system of claim 1, wherein said wheel support is comprised of a lower portion connected to a cross member of said frame, an angled portion extending forwardly and upwardly from said lower portion, and an upper portion extending from said angle portion substantially parallel to said lower portion.

6. The welding tank cart system of claim 5, wherein said front wheel is connected to said upper portion.

7. The welding tank cart system of claim 1, wherein said frame includes a handle and a support platform.

8. The welding tank cart system of claim 7, wherein said frame includes a pair of lower saddles and a pair of upper saddles for receiving a pair of welding tanks.

9. A welding tank cart system, comprising:
   a frame, wherein said frame includes a handle, a support platform, and a pair of lower saddles and a pair of upper saddles for receiving said pair of welding tanks;
   a pair of side wheels rotatably connected to opposing sides of said frame;
   a wheel support connected to a front portion of said frame, wherein said wheel support is comprised of a lower portion connected to a cross member of said frame, an angled portion extending forwardly and upwardly from said lower portion, and an upper portion extending from said angle portion substantially parallel to said lower portion;
   wherein said front wheel is connected to said upper portion;
   a front wheel connected to said wheel support, wherein said front wheel is comprised of a caster wheel;
   a tray pivotally connected at opposing ends thereof to an upper portion of said frame for self-leveling;
   a chain crank attached to same frame, wherein said chain crank is positioned between a pair of welding tanks and is connected to a chain structure for tightening and loosening said chain structure, wherein said chain structure extends about said pair of welding tanks to retain the same upon said frame;
   wherein said chain crank is comprised of:
      a mount attached to said frame;
      an elongated member extending from within said mount in a movable manner along a longitudinal axis of said elongated member, wherein said elongated member is threadably received within said mount;
      an eyelet attached to a distal end of said elongated member, wherein said eyelet is connected to said chain structure; and
      a crank handle attached to said elongated member opposite of said eyelet.

10. A welding tank cart system, comprising:
    a frame;
    a pair of side wheels rotatably connected to opposing sides of said frame;
    a wheel support connected to a front portion of said frame; and
    a front wheel connected to said wheel support, wherein said front wheel is comprised of a swivel wheel;
    wherein said wheel support is comprised of a lower portion connected to a cross member of said frame, an angled portion extending forwardly and upwardly from said lower portion, and an upper portion extending from said angle portion substantially parallel to said lower portion.

11. The welding tank cart system of claim 10, wherein said front wheel is connected to said upper portion.

12. A welding tank cart system, comprising:
    a frame;
    a pair of welding tanks positioned upon said frame;
    a chain structure attached to said frame and extending about said pair of welding tanks to retain the same upon said frame;
    a pair of side wheels rotatably connected to opposing sides of said frame; and
    a chain crank attached to same frame, wherein said chain crank is positioned between said pair of welding tanks and is connected to a chain structure for tightening and loosening said chain structure.

13. The welding tank cart system of claim 12, including a tray pivotally connected at opposing ends thereof to an upper portion of said frame for self-leveling.

14. The welding tank cart system of claim 12, wherein said chain crank is comprised of:
- a mount attached to said frame;
- an elongated member extending from within said mount in a movable manner along a longitudinal axis of said elongated member, wherein said elongated member is threadably received within said mount;
- an eyelet attached to a distal end of said elongated member, wherein said eyelet is connected to said chain structure; and
- a crank handle attached to said elongated member opposite of said eyelet.

15. The welding tank cart system of claim 12, wherein said front wheel is comprised of a caster wheel.

16. The welding tank cart system of claim 12, wherein said wheel support is comprised of a lower portion connected to a cross member of said frame, an angled portion extending forwardly and upwardly from said lower portion, and an upper portion extending from said angle portion substantially parallel to said lower portion.

* * * * *